United States Patent [19]

Wertheimer et al.

[11] 3,714,885
[45] Feb. 6, 1973

[54] BROILER-GRILL COOKING APPLIANCE

[75] Inventors: Donald J. Wertheimer, Milwaukie, Oreg.; Richard D. Fish, Bellevue, Wash.; Ralph A. Holmes, Portland, Oreg.

[73] Assignee: F. S. Manufacturing Company

[22] Filed: Oct. 15, 1971

[21] Appl. No.: 189,548

[52] U.S. Cl. ..................99/425, 99/446, 99/447, 219/524
[51] Int. Cl. ..............................A47j 37/06
[58] Field of Search................99/425, 340, 422–423, 99/424, 352, 355, 392, 446–447; 126/37 B; 219/524, 479, 477, 392, 538

[56] References Cited

UNITED STATES PATENTS

| | | | |
|---|---|---|---|
| 1,090,924 | 3/1914 | Lawrence | 99/445 UX |
| 1,745,340 | 1/1930 | Parker | 99/446 |
| 2,362,757 | 11/1944 | Lang | 99/425 |
| 2,367,626 | 1/1945 | Shroyer et al. | 99/425 |
| 2,685,637 | 8/1954 | Oatley | 99/422 |
| 2,702,848 | 2/1955 | Scofield et al. | 99/425 UX |
| 2,704,320 | 3/1955 | Crawford | 99/425 UX |
| 2,715,173 | 8/1955 | Farguharson | 99/425 UX |
| 3,236,998 | 2/1966 | Wertheimer et al. | 219/524 |
| 3,317,709 | 5/1967 | Beasley | 99/422 X |

Primary Examiner—Billy J. Wilhite
Assistant Examiner—Arthur O. Henderson
Attorney—Lee R. Schermerhorn

[57] ABSTRACT

A griddle unit forms a base for a hinged hood containing a broiler unit whereby meat, fish and other products may be cooked very rapidly and efficiently by grilling them on the bottom and simultaneously broiling them on the top. The source of heat for the broiler is a plurality of tungsten filament quartz tube lamps mounted beneath a reflector plate. Counterbalancing springs in supporting hollow stanchions assist in raising the hood and a spring catch positioner holds the hood open at a 60° angle for normal use or in vertical position for use of the griddle without the broiler. The broiler is energized only when it is brought down into horizontal broiling position above the griddle. A grease trough along the front of the griddle discharges into a grease pan in the base which is enclosed in a slide housing to prevent overflow into the base of the appliance. An accordion-folded spring plate presses electric heating elements into good heat conducting relation with the under side of the griddle plate for efficient heating of the griddle.

14 Claims, 7 Drawing Figures

PATENTED FEB 6 1973

INVENTORS
DONALD J. WERTHEIMER
RICHARD D. FISH
RALPH A. HOLMES

BY Les R. Schermerhorn
Attorney

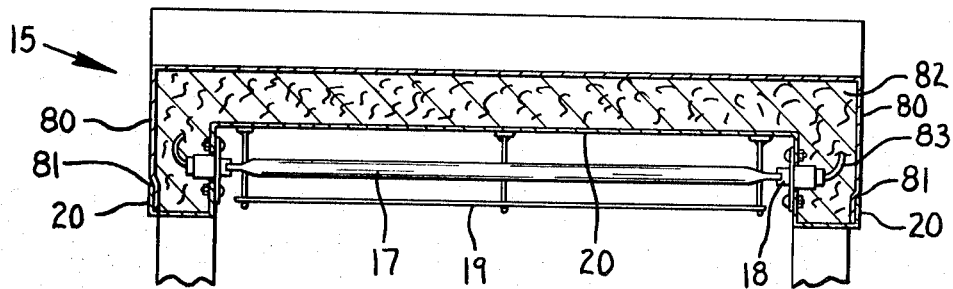
Fig. 6
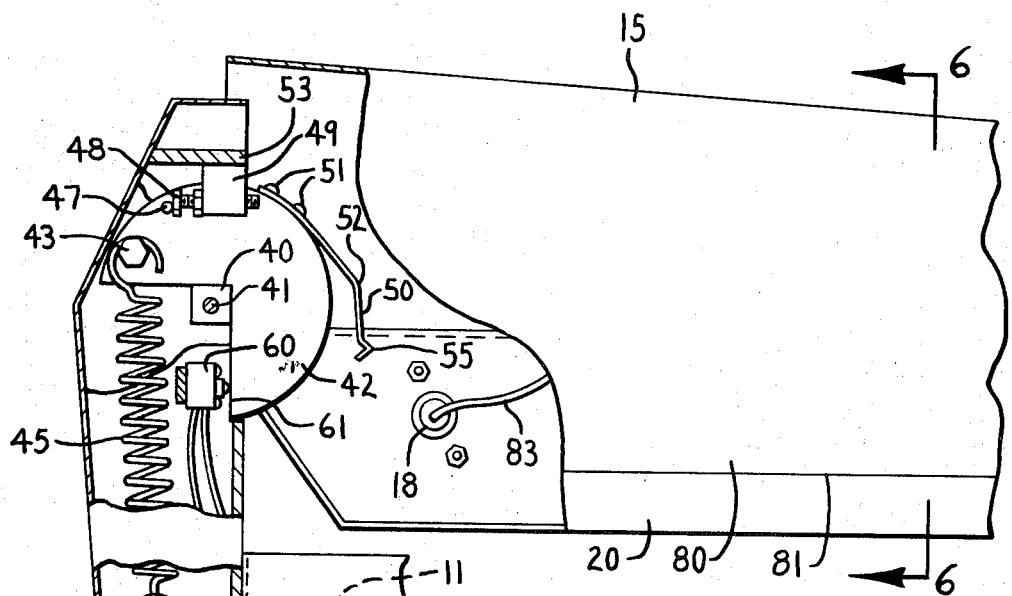
Fig. 5
INVENTORS
DONALD J. WERTHEIMER
RICHARD D. FISH
RALPH A. HOLMES
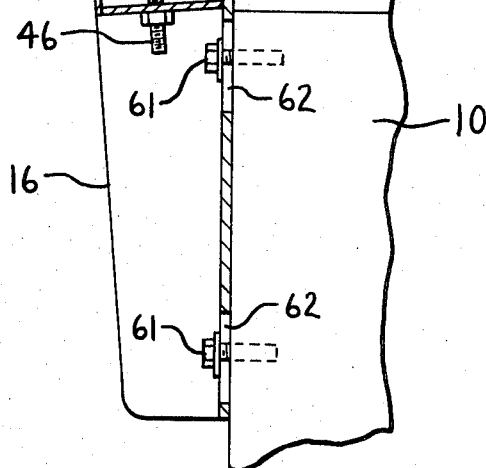
Attorney

BROILER-GRILL COOKING APPLIANCE

BACKGROUND OF THE INVENTION

This invention relates to improvements in a broiler-grill cooking appliance for cooking food by grilling it on the under side and simultaneously broiling it on the upper side.

More specifically, the invention relates to improvements over the cooking apparatus in the Wertheimer et al U.S. Pat. No. 3,236,998 issued Feb. 22, 1966. Combination broiler-grill cooking apparatus has many advantages.

The grilling of the bottom surface of a food product on a metal plate accomplishes a desirable browning, giving the food an appetizing appearance. The penetrating qualities of the near-infrared broiler and the sealing qualities of the griddle cook meat and fish to any desired degree from rare to well done and still retain the natural juices and tenderness of the product. By reducing the cooking time, shrinkage is reduced and the product does not dry out.

The broiler is energized only upon demand and the griddle absorbs unused heat from the broiler, reducing the energy which must be supplied by the griddle heating elements. By increasing the cooking speed, production is correspondingly increased thereby reducing the space required in the kitchen for a given output. Since the broiler operates only when cooking, a cooler kitchen results. Pre-heating of the broiler is not necessary because the quartz lamp heaters reach maximum temperature instantly.

Objects of the invention are, therefore, to provide an improved broiler-grill cooking appliance, to provide structural and operational improvements over the cooking apparatus disclosed in the Wertheimer et al U.S. Pat. No. 3,236,998, to provide an improved mounting for the griddle heating elements, to provide an improved grease pan for the griddle, to provide an improved hinge mounting for the broiler, to provide an improved broiler construction which excludes grease vapors from the insulation and electrical connections, and to provide improved ventilation for the operator.

SUMMARY OF THE INVENTION

In the present construction, a broiler hood is hingedly mounted on hollow stanchions on a griddle unit for pivotal opening movement to an inclined position while the broiler is in use and to a vertical position when the griddle is used alone. Tungsten filament quartz tube lamps in the hood supply near-infrared heat to the top of the product for broiling, the lamps being energized only when the hood is lowered to broiling position. An improved reflector plate and socket mounting for the lamps prevents grease vapors from entering into the wiring and insulation space in the hood and keeps the grease vapors out of the lamp sockets.

In the base an improved grease pan is contained in a slide housing which prevents overflow into the wiring and other electrical components in the base housing. Resilient means are provided for holding electric heating elements in good thermal conducting relation with the under side of the griddle, allowing for expansion and contraction with heating and cooling. A rear shield on the base forms a chimney to draw grease smoke and fumes away from the operator.

The invention will be better understood and the foregoing and other objects and advantages will become apparent from the following description of the preferred embodiment illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 5 is an enlarged fragmentary side elevation view with parts broken away, showing the improved hinge construction for the broiler hood;

FIG. 6 is a view on the line 6—6 in FIG. 5; and

DESCRIPTION OF THE PREFERRED EMBODIMENT

Figure 1:
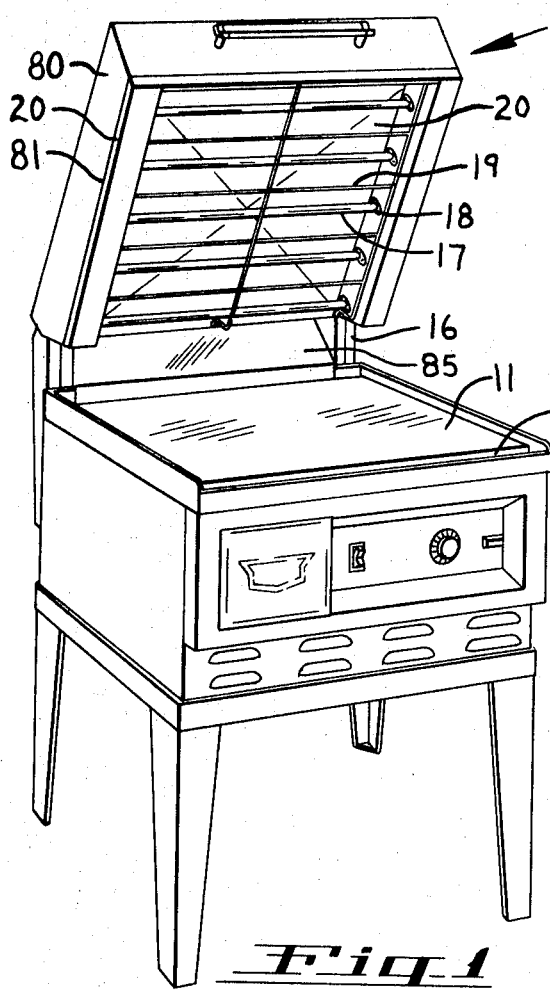
FIG. 1 is a perspective view of a broiler-grill cooking appliance embodying the invention.

As shown in FIG. 1, the appliance comprises a base unit 10 having a griddle plate 11 with a grease trough 12 extending along its front edge. A broiler hood 15 is pivotally mounted on a pair of hollow stanchions 16 on the back of base unit 10. For broiling, the hood 15 is lowered to its horizontal solid line position in FIG. 4. For the purpose of placing a product on the griddle or removing the product, the hood opens to a first rest position at 15a at an angle of approximately 60° and when the griddle is used alone, the hood swings back out of the way to the vertical position shown at 15b.

Food on the griddle is broiled on its top side by a plurality of tungsten filament quartz lamp tubes 17 mounted in sockets 18 in the hood. These lamps are protected by a removable wire guard 19. Heat radiated upward from the lamps 17 is reflected down toward the griddle by a stainless steel reflector plate 20.

Figure 3:
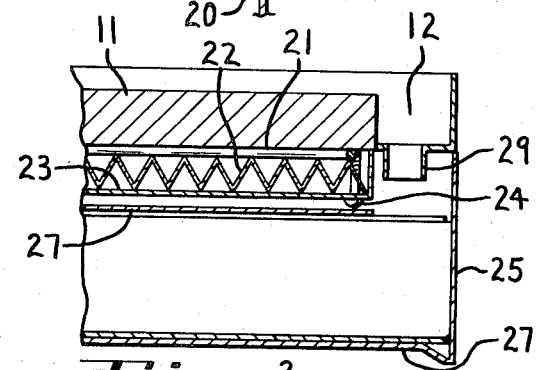
FIG. 3 is a fragmentary sectional view through the base, showing how the electric heating elements are pressed against the under side of the griddle plate.

The griddle plate 11 is heated by coils of resistor wire sheathed in metal tubes 21, as shown in FIG. 3. Tubes 21 are disposed in convolutions which are pressed firmly against the under side of griddle plate 11 by a single rectangular corrugated metal spring plate 22 loosely supported in a substantially rigid pan 23. Pan 23 is secured to the under side of griddle plate 11 by screws 24. As the parts expand and contract upon heating and cooling, the corrugated plate 22 maintains firm contact between the tubes 21 and the under side of the griddle plate for efficient thermal conduction.

Spring plate 22 is preferably accordion-folded as shown, having linear ridges which cross the convolutions of heating element tubes 21 at a multiplicity of points pressing the entire length of tubes 21 resiliently against the griddle plate at all times. The depth of the corrugations prevents overheating of the spring plate so that it does not lose its resilience as do conventional clips and clamps. The latter, after repeated expansion and contraction of tubes 21, fail to maintain tight thermal contact between tubes 21 and the griddle plate resulting in very inefficient heating of the griddle plate and slower temperature recovery, which wastes electrical power and heats the kitchen unnecessarily. An efficiently heated griddle helps to keep the kitchen cool.

Thus, spring plate 22 is uniquely effective in promoting the most efficient heat transfer from tubes 21 to griddle plate 11 while at the same time reducing the loss of heat in a downward direction. The point contacts of the ridges of the spring plate with tubes 21 minimize heat conduction to the spring plate and the surface of the spring plate reflects downward radiation back to the griddle plate. These features enhance temperature recovery of the griddle plate when cold food is placed on the griddle, speeding up the cooking operation. Also, the ridges of the spring plate support convolutions of tube 21 closely adjacent the margins of the griddle plate for improved peripheral heating.

Figure 2:
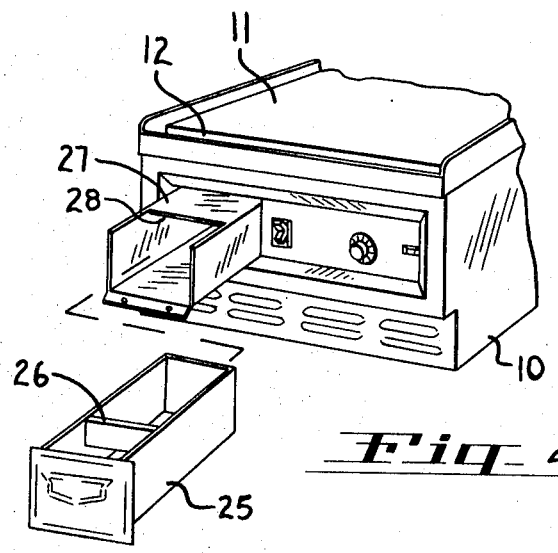
FIG. 2 is a fragmentary perspective view of the base of the appliance, showing the removable grease pan and its slide housing.

As shown in FIG. 2, a grease pan 25 containing a transverse baffle plate 26 is mounted in a slide housing 27 in the base unit 10. Slide housing 27 is liquid-tight and envelops the top, bottom, sides and back end of grease pan 25 to prevent overflow of grease into the interior of base unit 10. Any overflow is discharged on the outside of the front of the base unit, making the negligence of the operator readily apparent without damaging any part of the electrical system contained in the base unit.

The top wall of slide housing 27 is cut away at 28 to allow grease to drip from downspout 29 in grease trough 12 into the pan 25. Baffle 26 prevents sloshing of the grease as the pan 25 is withdrawn forwardly from its slide housing 27. In FIG. 2 the slide housing 27 is partially withdrawn for illustration; it normally remains contained within base unit 10.

Each back corner of hood 15 is connected with a pivot block 40 which rotates on a pivot rod 41 mounted in the stanchion 16, as shown in FIG. 5. This connection includes a sector block 42 which is welded to pivot block 40 and carries an anchor screw 43 for the upper end of a tension spring 45. The lower end of spring 45 is anchored in an adjustable eyebolt 46 with the spring contained within the hollow stanchion. The eyebolts 46 in the two stanchions are adjusted so that the springs 45 will counterbalance part of the weight of hood 15 in its operative horizontal position.

Thus, during a broiling operation, the hood remains in its lower position, this position being determined by a pin 47 in sector block 42 which engages an adjustable stop screw 48 in a block 49 in the upper end of the stanchion. Each sector plate 42 is also provided with a broiler hood positioner spring catch 50. Catch 50 is a leaf spring secured at its upper end to the sector block 42 by screws 51.

Figure 4:
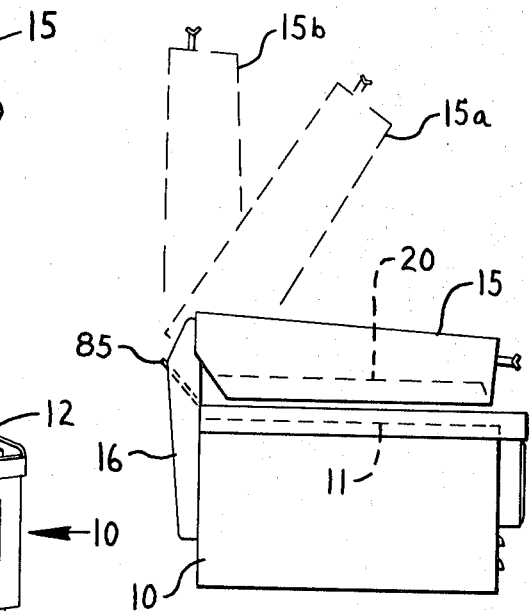
FIG. 4 is a side elevation view of the appliance, showing the alternative inclined and vertical rest positions of the broiler hood in broken lines.

Spring 50 has a bend at 52 which engages a horizontal plate 53 in the stanchion when the hood is raised 60° to its intermediate position at 15a in FIG. 4. In this inclined position, the weight of the hood has a lesser mechanical advantage while the spring 45 has a greater mechanical advantage whereby the hood and the two springs 45 in the two stanchions are in approximate balance in the 15a position. Bend 52 in the spring operates as a friction detent to provide a rest position for the hood at this point. When the hood is raised to its vertical position at 15b, the bend 52 slides under plate 53 and a hooked bend 55 at the end of the spring engages the front edge of plate 53 and operates as a stop to prevent the hood from swinging backward beyond the vertical.

The supply wires for quartz lamps 17 are housed in the stanchions 16. One of the stanchions also contains a switch 60 for deenergizing the quartz lamps 17 when the hood is raised. When the hook is lowered to broiling position, a surface 61 on sector block 42 closes the switch 60.

Screws 61 in base unit 10 extend through slots 62 in the front walls of the stanchions for mounting the stanchions on the base unit. The slots provide vertical adjustment for the height of the broiler hood above griddle plate 11.

Figure 7:
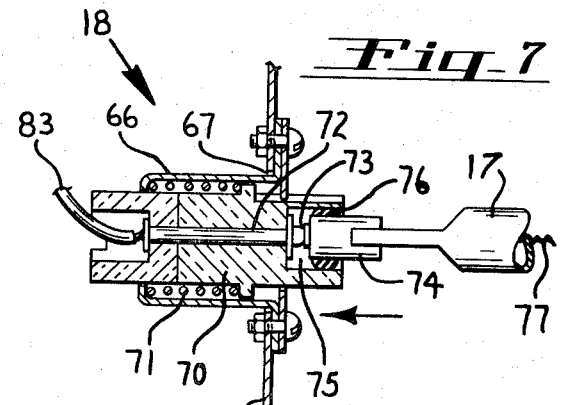
FIG. 7 is an enlarged fragmentary sectional view showing the socket holder for the quartz lamps in the broiler.

As shown in FIGS. 6 and 7, the quartz lamps 17 are mounted in spring socket fittings 18 for convenient replacement. Each socket fitting 18 has a tubular housing 66 which is mounted in an opening 67 in the reflector plate 20. A socket part 70 is urged outward by a spring 71 to press the socket contact member 72 against a contact member 73 in a cylindrical end fitting 74 on the lamp tube 17. This electrical contact is made in a socket recess 75 in the resiliently mounted socket part 70.

In order to prevent the penetration of hot grease vapors into this contact chamber, the tube end fitting 74 is provided with a soft silicone rubber washer 76. The washer 76 is of such size that it may be squeezed into the socket recess 75 to seal the outer end of the contact chamber. Although tungsten filament 77 operates at approximately 4,000°F., the socket parts remain cool enough to avoid deterioration of the silicone rubber.

The hood 15 is encased in a top shell 80. In order to prevent the entrance of hot grease vapors into this shell, the reflector plate 20 is continuous around the lower edges of the hood and has an upstanding edge flange making a joint at 81 with the lower edge of shell 80 on outside surfaces of the hood. The other portions of reflector plate 20 are spaced away from shell 80 and this space is filled with thermal insulation 82. Circuit wires 83 for the lamps 17 are embedded in this insulation.

It is desired to keep the grease vapors out of the insulation 82 which is inherently porous and to prevent the vapors from reaching the wires 83. This is accomplished by avoiding any opening or joint in the inside surface of the hood. Grease deposits in this space deteriorate the electrical insulation on the wires, impair the effectiveness of thermal insulation 82 and create a fire hazard.

Grease deposits on lamp tubes 17 and reflector plate 20 attain a sufficiently high temperature to burn themselves off so that the lamps and reflector plate do not require cleaning. All that is necessary is to wipe the lamp tubes at infrequent intervals with a damp cloth. The stainless steel reflector plate becomes discolored from the high temperature, causing it to absorb and reradiate, rather than reflect, a considerable portion of the radiant energy received from filaments 77. This is of advantage to avoid cleaning maintenance, making the reflector self-cleaning.

As shown in FIGS. 1 and 4, the base unit 10 is equipped with a removable inclined splash and radiation shield 85 extending upwardly and rearwardly between the stanchions 16. This shield intercepts heat radiation in a rearward direction to prevent damage to a wall or other equipment immediately behind the appliance.

Shield 85 also forms a chimney to create a natural draft across the griddle and under the hood from front to back, discharging any smoke and fumes upwardly to the rear, away from the operator, for expedient removal by the usual kitchen ventilating hood or wall ventilating opening behind the appliance. This chimney effect is enhanced by eliminating the depending skirt portion of the hood on its back side as seen in FIGS. 1 and 5. This provides an unrestricted passageway to the chimney for drawing a current of air across the griddle.

Having now described our invention and in what manner the same may be used, what we claim as new and desire to protect by Letters Patent is:

1. A cooking appliance comprising a griddle unit having a griddle plate with a top cooking surface, an electric heating element contained in a metal tube having convolutions extending across said plate, a corrugated spring plate having ridges crossing the convolutions of said heating element tube, a pan supporting said spring plate, and means securing said pan to the under surface of said griddle plate, causing said pan to press said ridges of said spring plate resiliently against said heating element tube at a multiplicity of points and hold substantially the entire length of said heating element tube firmly against said under surface of said griddle plate to maintain good thermal conducting relation between said heating element tube and said griddle plate with effective peripheral heating and accommodate expansion and contraction of the parts from heating and cooling.

2. An appliance as defined in claim 1, said spring plate being corrugated in accordion folds.

3. An appliance as defined in claim 1 including a grease gutter extending along one side of said cooking surface, said gutter having a drain opening therein, a slidable grease pan mounted under said drain opening, and a slide housing supporting said grease pan, said slide housing having an open front end for the removal of said grease pan and for discharging any overflow from the grease pan out of the front of said appliance.

4. An appliance as defined in claim 1 including a pair of hollow stanchions on the back side of said griddle unit, a broiler hood mounted on hinge means in said stanchions, counterbalancing springs for said broiler hood in said stanchions, stops in said hinge means supporting said broiler hood in horizontal position above said griddle plate with said springs balancing a portion of the weight of the broiler hood, and a spring detent in said hinge means arranged to hold said broiler hood in an inclined position and to stop said broiler hood in a vertical position.

5. An appliance as defined in claim 4, said springs extending vertically in said stanchions, and adjustable anchor means in said stanchions connected with the lower ends of said springs.

6. An appliance as defined in claim 4 including means having vertical adjustment connecting said stanchions with said griddle unit.

7. An appliance as defined in claim 4 including radiant electric heating elements in said broiler hood, and a switch in one of said stanchions actuated by said hinge means to energize said heating elements in said hood when the hood is moved to said horizontal position.

8. An appliance as defined in claim 4 including electric sockets in said hood, tubular radiant heating elements mounted in said sockets, and sealing washers on said heating elements sealing said sockets against the entrance of grease vapors from food cooked in the appliance.

9. An appliance as defined in claim 4, including a splash and radiation shield extending rearward and upward between said stanchions from said griddle unit in spaced relation to said hood, the upward sweep of said shield behind said hood forming a chimney to induce a draft of air between said griddle and hood flowing from front to back.

10. A broiler hood comprising an outer shell having top and vertical side portions, an inner reflector plate having top and vertical side portions spaced within said outer shell, said space between said outer shell and reflector plate having top and vertical side portions filled with thermal insulation, said reflector plate comprising a continuous sheet of metal extending outward from the lower edges of its side portions to the lower edges of said side portions of said outer shell, and upturned edge flanges on said sheet connecting with said side portions of said outer shell on the outside of said hood whereby there is no joint within said hood to admit grease vapors into said insulation, electric sockets in said vertical side portions of said reflector plate on opposite sides of the hood, and tubular radiant heating elements mounted in said sockets.

11. A broiler hood as defined in claim 10 including flexible sealing washers on said heating elements received in said sockets and sealing said sockets against the entrance of grease vapors.

12. A broiler hood as defined in claim 10 including a pair of hollow stanchions, pivot rods in said stanchions, pivot members on said hood rotatable on said rods, abutment means on said pivot members engaging stops in said stanchions when the hood is in horizontal position, a switch in one of said stanchions actuated by one of said pivot members to energize said heating elements in said horizontal position of the hood, springs in said stanchions connected with said pivot members to counterbalance part of the weight of the hood, and leaf spring detents on said pivot members engageable with said stanchions in two different positions to hold said hood raised in inclined position and in vertical position.

13. A broiler hood as defined in claim 12, said pivot members comprising 270° circular blocks each having a right angle notch therein, and a square pivot block mounted in said notch and journaled on one of said pivot rods.

14. A cooking appliance comprising a griddle, a pair of stanchions on the rear side of said griddle, a broiler hood pivotally mounted on said stanchions in spaced relation above the griddle, said broiler hood having an outer shell and an inner reflector plate, thermal insulation disposed between said shell and plate, said reflector plate comprising a single continuous sheet of metal having upturned edge flanges connected with said outer shell in a joint on the outside of the hood, radiant heating elements mounted in sockets in said reflector plate, and a splash and radiation shield extending rearward and upward from the rear side of said griddle forming a chimney to induce a draft of air between said griddle and hood flowing from front to rear.

* * * * *